United States Patent [19]

Kotegawa et al.

[11] Patent Number: 4,925,679
[45] Date of Patent: May 15, 1990

[54] KOJI-MAKING METHOD BY KOJI-CUTTING

[75] Inventors: Michiro Kotegawa; Yoshihiro Kuribayashi, both of Usuki, Japan

[73] Assignee: Fundokin Shoyu Kabushiki Kaisha, Oita, Japan

[21] Appl. No.: 199,699

[22] Filed: May 27, 1988

[30] Foreign Application Priority Data

May 28, 1987 [JP] Japan .................. 62-129977

[51] Int. Cl.$^5$ .................. A23L 1/20; A23L 1/238
[52] U.S. Cl. .................. 426/18; 426/46
[58] Field of Search .................. 426/18, 46; 99/451, 99/452, 466

[56] References Cited

U.S. PATENT DOCUMENTS

| | | | |
|---|---|---|---|
| 2,709,656 | 5/1955 | Greer et al. | 99/466 |
| 4,048,340 | 9/1977 | Izumi | 426/46 |
| 4,108,058 | 8/1978 | Sjoholm et al. | 99/466 |
| 4,209,535 | 6/1980 | Williams | 426/46 |
| 4,407,826 | 10/1983 | Noda et al. | 426/18 |

Primary Examiner—Donald E. Czaja
Assistant Examiner—Evan Federman
Attorney, Agent, or Firm—Birch, Stewart, Kolasch & Birch

[57] ABSTRACT

A koji-making method using a rotary type aeration koji-making apparatus having a culture floor on which a koji-substrate is placed, a plurality of cutting blade holders located at a position above the koji-substrate and a plurality of cutting holders attached side by side to each of the cutting holders, wherein the cutting blades are deeply inserted into the koji-substrated before and after the stage at which a koji-substrate solidifying phenomenon takes place, or when the temperature of the fermenting material rises excessively after a lapse of 22 to 25 hours from the beginning of koji-making to vertically cut the koji-substrate by making use of the vertical movement of the cutting blades and the concentrical movement of the culture floor, thereby obtaining koji possessing an excellent flavor.

5 Claims, 2 Drawing Sheets

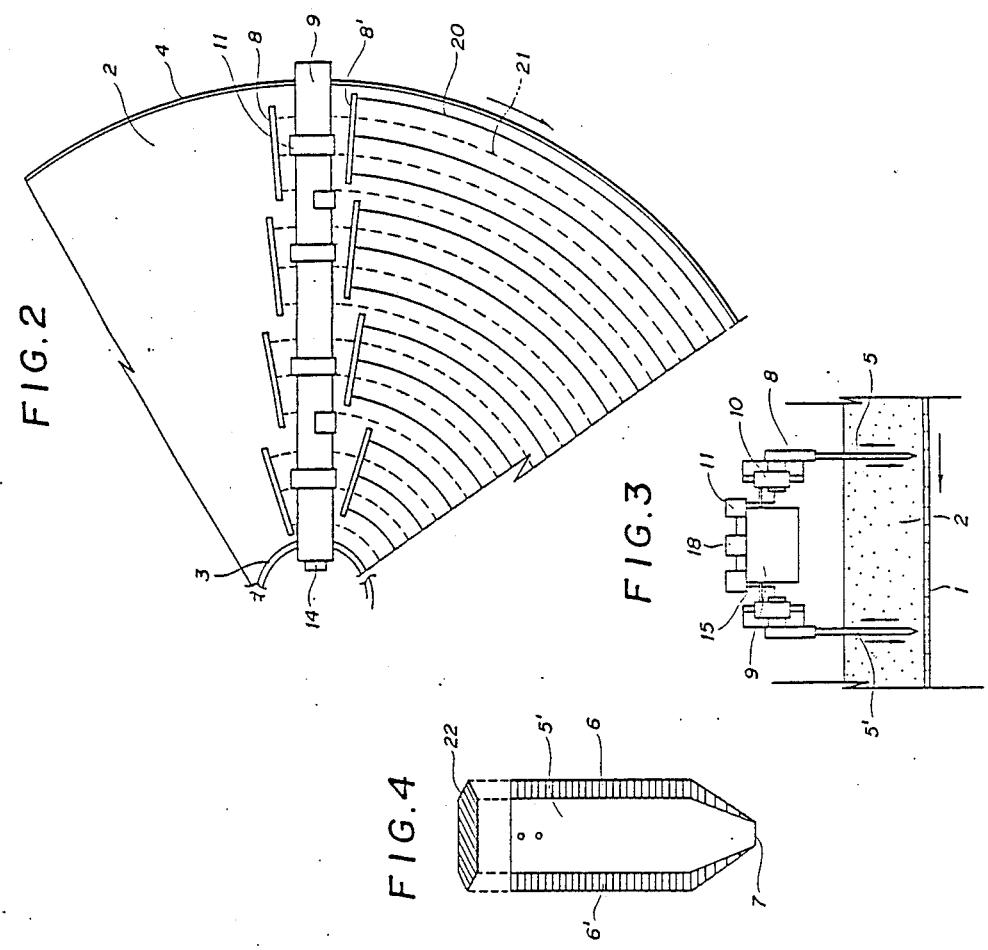

KOJI-MAKING METHOD BY KOJI-CUTTING

FIELD OF THE INVENTION

The present invention relates to a method for making koji which has an appearance and flavor suitable for fermented foodstuffs by the use of a rotary type aeration koji-making apparatus.

BACKGROUND OF THE INVENTION

The major function of koji during fermentation is to supply various enzyme sources for digesting various components of rice, wheat/barley and soybean. Also, the koji provides nutrients for promoting the propagation, growth and fermentation of valuable microorganisms and imparts flavor to the products of koji-mold and to the fermented products of koji-mold mass.

Accordingly, the object of koji-making is to properly form and build up enzymes, to promote the growth of valuable microorganisms by the growth of koji-mold and to form a flavor component precursor. Thus, koji-making is carried out for the purpose of obtaining koji products having an appearance and flavor suitable as koji.

Currently available koji-making methods have been developed on the basis of the quality of koji products which have been obtained by the koji-tray method which have been attained by the result of trial and error. According to the koji-tray method, koji is made by introducing cooked rice beneath a floor for seeding, fermenting it for about 20 hours and then placing it on a koji-tray to a thickness of about 4 to 5 cm. During the process, the temperature of the fermenting material is controlled by suitable procedures such as during the first, second and last treatments in koji-making. The temperature of the fermenting material is controlled because it rises sharply during the growth of koji-mold. The humidity is also regulated so as to set up suitable conditions under which the koji-mold grows easily.

The koji-tray method is best suited to impart flavor to fermented foodstuffs because the resulting koji excels in appearance, possesses a peculiar flavor, and is soft to the touch. However, the koji-tray method must be carried out under koji-making conditions which are very detrimental to the system in view of physiology and it requires a great deal of labor.

In order to eliminate the defects of the above-mentioned koji-tray method, the mechanization of koji-making has been expedited primarily to save labor. However, it has been found that the quality of the resulting koji is still unsatisfactory.

In recent years, a number of new techniques have been developed with regards to the mechanization of koji-making so as to obtain koji products which are equivalent in quality to those obtained by the koji-tray method. According to the mechanized arrangement, koji is built up to a considerable thickness and in a large amount in a vessel of large dimensions. This arrangement also provides for the forced aeration during the koji-making. Air which has been regulated to a suitable temperature and humidity is forced through a koji-layer. The koji-layer is turned upside down by mechanical means, such as with rotary stirring, at the time when heat is so vigorously generated during the propagation or growth of the koji-mold so that koji-strains grow and entangle with each other. This agitation results in a koji-layer which is disentangled in order to promote aeration and so that the temperature and humidity of the fermenting material can be suitably regulated.

However, it has been found that forced aeration carried out by rotary stirring adversely affects the quality of koji because it considerably cuts the koji-strains as a result of the treatment by hand which involves the reversal of the koji-layer. Moreover, this forced aeration by rotary stirring results in lumps of koji which may result in over-heating as well as a delay in the growth of strains after treatment by hand.

Furthermore, the growth of koji-mold becomes so vigorous during aeration type koji-making at later stages that heat is vigorously generated and the dissipation of moisture reaches a maximum. This leads to further growth and entanglement of koji-strains, which in turn results in irregular and local cracks as well as local aeration. When koji portions which are undergoing unsatisfactory aeration are permitted to stand over an extended period of time in a state wherein the temperature of the koji generates abnormal amounts of heat which is locally and excessively increased, the flavor of koji not only deteriorates, but proper growth of koji-mold is also affected, thus leading to an unsatisfactory saccharification.

To avoid these disadvantages, the treatment by hand has been repeatedly carried out by mechanical operations such as by stirring. It has been found, however, that the strains are so increasingly cut that the proper growth of mold is increasingly inhibited. For the same purpose, it has been proposed to increase the amount of aeration and to lower the temperature. However, it has been noted that difficulty is encountered in obtaining koji of good flavor, since koji is excessively contacted by a large amount of cold air, and the mold mass which is produced is exposed to a large amount of air over an extended period of time at a stage where the formation and accumulation of flavor reach a maximum.

BRIEF DESCRIPTION OF THE DRAWINGS

For a better understanding of the present invention, the present invention will now be explained with reference to the accompanying drawings, which are given for the purpose of illustration alone.

FIG. 2 is a plan view showing the arrangement of the cutting blade holders for the koji-cutting blades and the koji-layer cut by the cutting blades at equal intervals.

FIG. 3 is a side view showing the operation of the koji-cutting device of FIG. 1.

FIG. 4 is an enlarged section and side view showing one cutting blade used with the embodiment illustrated in FIG. 1.

SUMMARY OF THE INVENTION

Figure 1:
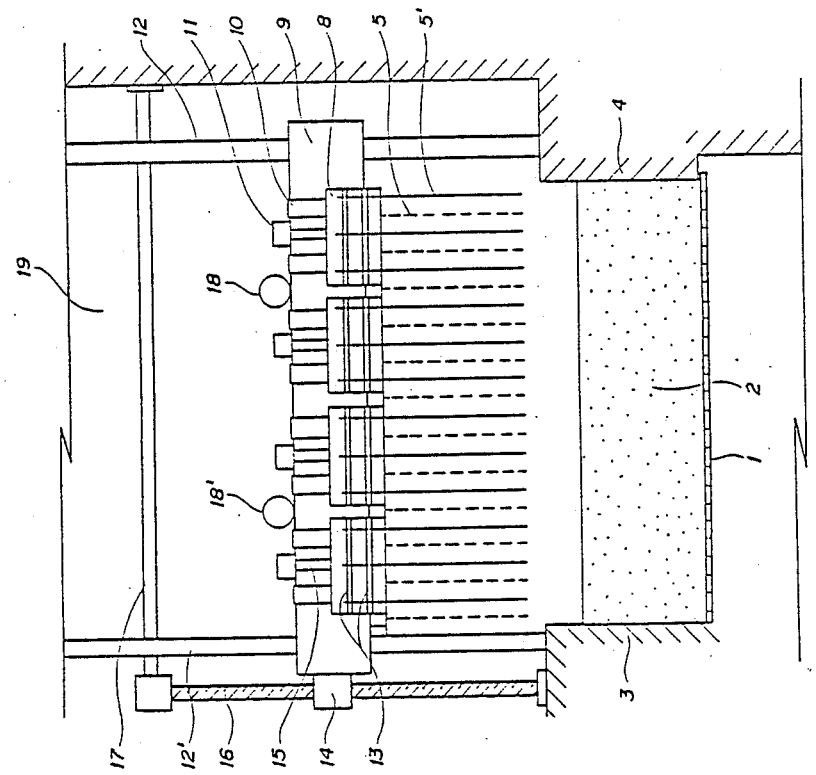
FIG. 1 is a schematical view showing the front of a koji-cutting device and the cross-section of the interior of a koji-making tank of a rotary type koji-making apparatus, wherein the device and the apparatus are used for carrying out the present invention.

The present inventors have made studies so as to obtain koji products which possess a satisfactory flavor quality suitable as koji for use during fermentation while taking the above mentioned disadvantages of koji-making methods into consideration. As a result of this research, the present inventors have found an aeration type koji-making method and apparatus which make it possible to produce koji products essentially comparable in quality to those produced by the koji-tray method and which produces koji products which are characterized by their own flavor.

Accordingly, the present invention provides a koji-making method which uses a rotary type aeration koji-making apparatus having cutting blades disposed above the koji-layer in order to cut a koji-substrate with the cutting blades at a suitable time such as after the lapse of 22 to 25 hours from the beginning of koji-making. This method provides for a number of fine grooves in the koji-substrate. According to the present invention, koji products of good quality and which are characterized by their own flavor can be obtained by reducing the damage to the koji-strains to an extremely low level. Moreover, during the process of the present invention the metabolic heat generated during the growth of the koji-mold and the evaporation of moisture is suitably regulated since the koji-layer is neither disentangled nor turned upside down.

More specifically, the present invention provides for a koji-making method using a rotary type aeration koji-making apparatus having a culture floor on which a koji-substrate is placed, a plurality of cutting blade holders located at a position above the koji-substrate, and a plurality of cutting holders attached side by side to each of the cutting holders, wherein the cutting blades are deeply inserted into the koji-substrate before or after a stage at which a koji-substrate solidifying phenomenon takes place or when the temperature of the fermenting material rises excessively after the lapse of 22 to 25 hours from the beginning of koji-making in order to vertically cut the koji-substrate by making use of the vertical movement of the cutting blades and the concentrical movement of the culture floor, thereby obtaining koji possessing an excellent flavor.

DETAILED DESCRIPTION OF THE INVENTION

Referring to the drawings, the method of the present invention and the apparatus for carrying it out will now be explained in more detail hereinbelow.

FIGS. 1, 2, 3 and 4 together show one embodiment of a rotary type aeration koji-making apparatus for carrying out the present invention.

The following reference numbers identify the components in the drawings:

1—culture floor,
2—koji-substrate,
3—inner wall of koji-making tank,
4—outer wall of koji-making tank,
5,5'—koji-substrate cutting blades,
6,6'—edge of cutting blade,
7—tip or extremity of cutting blade,
8—cutting blade holder,
9—central frame,
10—vertically movable holder portion
11—crank portion,
12,12'—supporting member of the vertically movable holder portion,
13—regulating screw,
14—nut portion,
15—crank shaft,
16—screw shaft for rising and falling,
17—driving shaft for rising and falling,
18,18'—motor for cutting,
19—inner part of koji-making tank,
20—groove cut by the rear blade,
21—groove cut by the front blade, and
22—sectional view of cutting blade.

More specifically, the rotary type aeration koji-making apparatus according to the present invention has a culture floor 1, on which a koji-substrate 2 is placed and which has two walls 3 and 4, and a cutting mechanism system comprising a central frame 9 provided at a suitable height position above the koji-substrate 2, wherein the frame is supported between both walls 3 and 4 and is designed to be vertically movable, and a plurality of cutting blade holders 8 each having a plurality of koji-substrate cutting blades 5 and 5' fixed thereto at equal intervals. The cutting blade holders 8 are arranged symmetrically with respect to the longitudinal direction of the central frame and in opposition to the surface of the koji-substrate placed on the culture floor. The cutting blade holders 8 are also held in such a way that the cutting blades 5 and 5' come in substantially right-angle contact with the substrate of koji which moves concentrically from the inner wall 3 to the outer wall 4 at pre-selected angles. As illustrated in FIG. 3, the central frame of the cutting mechanism is additionally provided with a vibration/reciprocation mechanism (comprising crank portions 11 and 15) for vertically vibrating/reciprocating the cutting blade holders 8 and a vertically movable holder portion 10 in the cylindrical form, which serves to prevent lateral vibration of the cutting blade holders and permits the cutting blades to be smoothly moved vertically for effective cutting of a koji-layer. Furthermore, a vertical/movement mechanism comprising a nut portion 14 is provided with the central frame which moves vertically while carrying out the present invention.

According to the present invention, the koji-layer is cut by the operation of the crank shaft 15 of the vibration/reciprocation mechanism by means for vertically moving the cutting blade holders which are fixedly provided with the cutting blades and which are attached to the central frame. Usually, the number and the width of the vibrations/reciprocations should preferably be about 120 to 150 per minute and about 100 mm, respectively. The cutting blades should be inserted as deeply as possible into the koji-substrate to such an extent that the culture floor is not damaged. Usually, the cutting blades should be preferably located about 10 mm above the culture floor.

On the other hand, the space between the cutting blades attached to each cutting blade holder should be suitably determined depending upon factors such as the amount and the type of the koji-substrate placed on the culture floor, the rate of evaporation of moisture during koji-making, the generation of heat, the fermentation of a flavor substance and the augmentation of an accumulated substance such as the propagation, growth and metabolism of the koji-mold mass.

In general, the greater the amount of koji which is used, the narrower the space between the cutting blades should be, and the smaller the amount of koji which is used the wider the space between the cutting blades should be. While the metabolic activity of koji-mold varies depending on factors including the dryness or wetness of the koji-chamber, the change in the temperature of the fermenting material, the koji-making time and so on, it is usually preferred that the space between the blades be wide in an initial culture stage when the metabolic activity is low and narrow at an intermediate or terminate stage when the metabolic activity is vigorous. The width of the space between the cutting blades should be about 20 to 50 mm, and preferably between 25 to 35 mm. The width of this space may be regulated by regulating screw 13.

The present invention is very effective before or after the stage of koji-making at which time the so-called "koji-substrate solidifying phenomenon" occurs. This phenomenon occurs 22 to 25 hours after initiation of the koji-making or after the static pressure of aeration rises, and at a terminate stage of koji-making when the strains entangle with each other.

Accordingly, the cutting device according to the present invention is actuated before or after the koji-substrate solidifying stage which occurs 22 to 25 hours after initiation of the koji-making. The cutting device is first actuated while rotating the culture floor. At the same time, the koji-cutting device is slowly lowered by a drive shaft 17 to force the cutting blades deep into the koji-substrate. As illustrated in FIGS. 2 and 3, deep grooves are concentrically provided in the koji-substrate at equal but narrow intervals by the vertical movement of the cutting blades and by the rotary movement of the culture floor, thereby cutting the koji-substrate. In the drawings, the arrow represents the direction of rotary operation. Reference numeral 20 and broken line 21 denote grooves cut by the rear and the front blades, respectively, and the space therebetween.

Each cutting blade should preferably be of such a shape that its resistance to the cutting of the koji-substrate is reduced. However, the cutting blade may be of any shape which permits it to be vertically moved and which permits it to cut the koji-layer. As illustrated in FIG. 4, a preferable cutting blade is flat, long relative to the width, at least as long as the thickness of the koji-substrate, and has both ends 6 and 6' acutely tapered toward its extremity or tip 7.

If a number of deep grooves are provided into the koji-substrate at equal but narrow intervals in accordance with the invention, excessive cutting of koji-mold strains is thereby reduced or prevented as compared to the conventional mechanical operation system, such as by using a stirrer. In addition, it is possible to prevent the occurrence of large cracks which may otherwise give rise to a delay in growth of the koji-mold. Moreover, the invention prevents irregular and local aeration associated with the processing by hand which results in a remarkable degradation of the flavor of koji. Thus, koji-making by cutting makes it possible to rapidly rid the koji of evaporated moisture by providing a preferable rate of air to pass through the cut grooves, thereby exerting a preferable effect upon the occurrence of minute cracks throughout the koji-substrate and providing for better aeration.

The conventional aeration type koji-making method is not preferred because of the type of flavor which results in the koji. Specifically, the nonpreferred flavor which results from the conventional techniques occurs because a large amount of aeration is needed since the growth of the koji-mold is so great that heat is vigorously generated and the dissipation of moisture reaches a corresponding maximum. Therefore, the koji is exposed to a large amount of air over an extended period of time.

According to the present invention, however, it is possible to easily control the conditions for aeration since a number of cut grooves are provided into the koji-substrate at equal and narrow intervals causing air to rapidly and easily pass through the koji-layer. Thus, it is possible to suitably promote the evaporation and dissipation of moisture from koji, thereby maintaining the flavor and quality of koji at a satisfactory level. The effect of the present invention becomes remarkable when the amount of the koji-substrate placed on the culture floor is increased, for instance, in the form of a thick layer. This is especially true because the temperature of the koji products can be maintained close to the aeration temperature and the variation in the quality of the koji-substrate between its upper and lower sites can be reduced to an extremely low level.

Furthermore, it is possible to considerably decrease the pressure and the amount of air which is applied to the koji-substrate and to avoid the exposure of the koji-substrate to a large amount of air, which may otherwise lead to the degradation of the flavor of koji. Specifically, this effect is achieved because the air permeability is further improved by the cutting of a number of deep grooves vertically into the koji-substrate. In addition, the flavor that koji inherently possesses can be imparted to and accumulated in the koji products since the koji-substrate can be cut to a preferable width.

Moreover, according to the present invention, it is possible to easily carry out the cutting operation within a shorter period of time. This is because both walls of the culture floor are provided with cutting blades having a length substantially equal thereto for the purpose of forming deep grooves into the koji-substrate and by making use of the concentrical movement of the culture floor.

Examples of the koji-making method by koji-cutting according to the present invention will now be given below. However, the present invention is not limited thereto.

EXAMPLE 1

Wheat koji was made by the rotary type aeration koji-making apparatus as illustrated in FIGS. 1 to 4, wherein the cutting blades, each having a length of 0.7 m, a width of 120 m/m, and a thickness of 9 m/m were attached to the associated holders and were regulated to a cutting with of 30 m/m. The amount of the koji-substrate which was used was 0.25 m$^3$ per 1 m$^2$ of the culture floor.

The cutting blades were operated at 120 reciprocations/min. and at a stroke of 100mm. The rate of rotation of the culture floor was regulated in such a way that the cutting of the koji-substrate was completed within 30 min., as was the case with the usual treatment by hand. The koji-cutting device was actuated to start lowering the blades downward toward the koji-substrate while, at the same time, rotating the culture floor when an air pressure of 50 to 80 mmAq was read on a static pressure meter as a result of the solidification of the koji. This occurred with the growth of the koji-strains after the lapse of 25 hours from the beginning of the koji-making.

The koji-substrate was deeply cut to the bottom along a circular path and at equal intervals of 30 mm. Air permeability was so considerably improved that the generation of heat and the evaporation of moisture from the koji were suitably promoted. The growth of strains proceeded very satisfactorily. The miso koji (or fermented soybean paste) which was obtained was found to possess a better flavor than would be possible by the teachings of the prior art, it was soft to the touch, and the strains were grown to a satisfactory level. This koji was also found to emit a strong flavor characteristic of wheat koji.

EXAMPLE 2

The procedure of Example 1 was followed except that the koji-cutting device was regulated to a cutting width of 25 mm and was operated at 150 reciprocations per min. After a lapse of 22 hours of koji-making from the ordinary treatment by hand, soy sauce koji (koji amount: 0.4 m$^3$/m$^2$) was cut when the static pressure meter indicated 80 to 120 mmAq.

Soy sauce koji was deeply cut to the bottom along a circular path and an equal intervals of 25 mm. The damage to the strains by cutting was remarkable reduced, as compared with the conventional treatment by hand using a stirrer.

The koji-substrate was sufficiently covered with strains, the soy sauce koji had an improved or better quality, and it was found to possess a characteristic flavor unattainable by the prior art methods.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A koji-making method using a rotary type aeration koji-making apparatus having a culture floor on which a koji-substrate is placed, a plurality of cutting blade holders located at a position above the koji-substrate and a plurality of cutting holders attached side by side to each of the cutting holders, which comprises inserting the cutting blades deeply into the koji-substrate before or after a koji-substrate solidifying phenomenon takes place after a lapse of 22 to 25 hours from the beginning of koji-making to vertically cut the koji-substrate by vertically moving the cutting blades and concentrically moving the culture floor.

2. The method according to claim 1, further comprising vertically vibrating and reciprocating the cutting blade holders.

3. The method according to claim 2, wherein the number of vibrations and reciprocations is about 120 to 150 per minute.

4. The method according to claim 2, wherein the width of the vibrations and reciprocations is about 100 mm.

5. The method according to claim 1, further comprising activating a cutting device while rotating the culture floor and while simultaneously lowering the cutting blades deep into the koji-substrate.

* * * * *